(12) United States Patent
Curl

(10) Patent No.: US 6,485,281 B1
(45) Date of Patent: Nov. 26, 2002

(54) WINDSHIELD AND GLASS REPAIR DEVICE

(76) Inventor: Michael J. Curl, 560 W. 21st St., Lot 123, Monroe, WI (US) 53566

( * ) Notice: Subject to any disclaimer, the term of this patent is extended or adjusted under 35 U.S.C. 154(b) by 0 days.

(21) Appl. No.: 09/568,345

(22) Filed: May 10, 2000

Related U.S. Application Data

(60) Provisional application No. 60/181,279, filed on Feb. 9, 2000, and provisional application No. 60/166,723, filed on Nov. 22, 1999.

(51) Int. Cl.$^7$ ............................................. B32B 35/00
(52) U.S. Cl. ......................... 425/12; 425/13; 249/103; 156/94; 264/36.21
(58) Field of Search ............................ 425/11, 12, 13; 264/36.1, 36.21, 102; 249/103, 140; 156/94

(56) References Cited

U.S. PATENT DOCUMENTS

| | | | |
|---|---|---|---|
| 3,993,520 A | 11/1976 | Werner et al. ................. | 156/94 |
| 4,047,863 A | * 9/1977 | McCluskey et al. .......... | 425/13 |
| 4,681,520 A | 7/1987 | Birkhauser, III ............. | 425/12 |
| 4,775,305 A | 10/1988 | Alexander et al. ............ | 425/12 |
| 4,776,780 A | 10/1988 | Banks .......................... | 425/12 |
| 4,820,148 A | * 4/1989 | Anderson ..................... | 425/12 |
| 4,995,798 A | * 2/1991 | Ameter ......................... | 425/12 |
| 5,116,441 A | 5/1992 | Campfield, Jr. .............. | 156/94 |
| 5,234,325 A | 8/1993 | Hill .............................. | 425/12 |
| 5,372,761 A | 12/1994 | Anderson, Sr. ............... | 264/36 |
| 5,425,827 A | 6/1995 | Campfield .................... | 156/94 |
| 5,429,692 A | 7/1995 | Campfield .................... | 156/94 |
| 5,589,018 A | 12/1996 | Campfield .................... | 156/94 |
| 5,591,460 A | 1/1997 | Wanstrath et al. ............ | 425/12 |
| 5,614,046 A | 3/1997 | Campfield .................... | 156/94 |
| 5,635,116 A | 6/1997 | Einiger et al. ................ | 264/36 |
| 5,897,882 A | 4/1999 | Gonzalez et al. ............. | 425/12 |
| 5,954,901 A | 9/1999 | Henderson ................... | 156/94 |
| 6,050,799 A | 4/2000 | Galyon ......................... | 425/12 |

* cited by examiner

*Primary Examiner*—Jan H. Silbaugh
*Assistant Examiner*—Joseph S. Del Sole
(74) *Attorney, Agent, or Firm*—Loyd W. Bonneville

(57) ABSTRACT

The invention relates to repair devices for repairing impact resistant glass such as windshields and vertical glass. The repair device can be used to repair many types of damage to glass including cracks, bulls-eye breaks, star breaks, and angle wing breaks. For repairing breaks, the repair device removes air from the break before the resin is applied to the air-evacuated break. For repairing cracks, the repair device pushes resin into the crack while the device is slid along the crack. The repair device has a piston assembly including a piston, a piston casing, and a piston casing receiver; a mounting bracket; and a suction unit, including a manual vacuum pump. A resin is loaded into the piston assembly and delivered to the break or crack by hydraulic pressure, pneumatic pressure, and/or vacuum mode.

4 Claims, 8 Drawing Sheets

WINDSHIELD AND GLASS REPAIR DEVICE

CROSS-REFERENCE TO RELATED APPLICATIONS

This application claims priority under 35 U.S.C. §119(e) to U.S. Provisional Patent Aapplications No. 60/181,279 filed Feb. 9, 2000 and No. 60/166,723 filed Nov. 22, 1999, the entireties of which are incorporated by reference herein.

FIELD OF THE INVENTION

The invention relates to methods and device for repairing breaks in impact resistant windows such as windshields and other glass, including vertical glass (i.e., vertically-oriented glass such as storefront windows). More particularly, the invention relates to a device and repair methods that are capable of repairing many types of damage to glass including, cracks, bulls-eye breaks, star breaks, and angle wing breaks.

DESCRIPTION OF THE RELATED ART

Impact-resistant glass used in automobiles typically is a laminate consisting of a layer of an energy-absorbing safety film, e.g., plasticized polyvinyl butyral, that is sandwiched between two layers of flexible plastic substrate, such as polyethylene terephthalate (PET) sheets. Breaks and cracks typically affect only the outer layer of the laminate. Breaks include damage such as bulls-eye breaks, star breaks, and angle wing breaks. The term cracks refers to elongated fractures. When breaks and/or cracks occur, the glass can be replaced. However, a less expensive alternative is to repair the break or crack.

In general, breaks and cracks in impact resistant glass such as a windshield are repaired by replacing the air in a broken area with a resin having a refractive index that matches the outer plastic layer. Resins that are useful for glass repair are well known to the art. Most systems on the market today apply a layer of resin directly over the broken area. Then, a vacuum is created to pull the air out of the break through the resin. The resin then is pulled into the void left by the vacuum and then cured with ultraviolet light. A shortcoming with this conventional setup is that because the air is withdrawn from the break after the resin is applied, the resin tends to block the travel of air out of the break, thereby requiring more time and leading to trapped air. Additionally, conventional setups are not able to address any trapped water in the broken area, which may occur due to direct precipitation, or a windshield being washed or subjected to the morning frost or dew. If the resin is first placed directly over the break without the break being completely dry, then not only does the air get filtered through the resin over the break but moisture will also be drawn through the resin to contaminate or weaken it.

Patents discussing methods and devices for repairing glass damage include U.S. Pat. No. 4,681,510 to Birkhauser, III; U.S. Pat. No. 4,775,305 to Alexander, et al.; U.S. Pat. No. 4,776,780 to Banks, U.S. Pat. No. 5,234,325 to Hill; U.S. Pat. No. 5,897,882 to Gonzalez et al.; U.S. Pat. No. 5,954,901 to Henderson.

Shortcomings of existing methods include dripping of the resin during the repair. Furthermore, conventional systems use a form of a gravity feed with pneumatic pressure, i.e., pressure by a gas, or an action by hydraulic pressure, i.e., pressure by a liquid. They have the disadvantage of either 1) not being able to evacuate existing air in the void completely, or 2) not having the ability to remove all air prior to resin application. Pneumatic pressure systems tend to be slower than hydraulic pressure for two reasons. First, the resin is used to displace air which also will mix with any moisture in the break, thereby contaminating the resin. Second, pneumatic pressure systems cannot force the resin into tight breaks as easily as hydraulic pressure systems, due to reduced pressure compared to hydraulic pressure. As a result, previous systems cannot repair glass in a timely manner, and the quality is questionable. Thus, what is needed is a repair method and device that avoids these and other shortcomings of conventional glass repair devices and methods.

SUMMARY OF THE INVENTION

The invention, which is defined by the claims set out at the end of this disclosure, is intended to solve at least some of the problems noted above. In a preferred version of the invention, a repair device is provided for repairing breaks and cracks in a substrate such as glass, windshields, vertical glass, and the like. Breaks include, but are not limited to, bulls-eye breaks (which are circular breaks moving out away from the impact point at a 45-degree angle, giving a characteristic circular dark spot), star breaks, and pock marks. Cracks include elongated fractures. Vertical glass refers to glass that is situated in a plane that is substantially upright. Unlike conventional glass repair devices, the configuration of the repair device according to the invention does not need to be altered in order to fix breaks or cracks. Furthermore, it does not rely on gravity to feed the resin. An exemplary version of the repair device has a piston assembly including a piston, a piston casing, and a piston casing receiver; a mounting bracket; and a suction unit including a manual vacuum pump and a vacuum gauge.

Breaks include damage such as bulls-eye breaks, star breaks, and angle wing breaks. The term cracks refers to elongated fractures. In a preferred method of operating the repair device for break repair, the resin is put into the piston assembly and applied to an air-evacuated break. For a preferred crack repair method, the resin is forced into a crack with hydraulic pressure followed by pneumatic pressure if desired or hydraulic pressure if the crack is too tight to accept pneumatic pressure.

An exemplary repair device for repairing breaks and cracks in a substrate has a piston assembly, a mounting bracket and a pump unit. The piston assembly has a piston, a piston casing and a piston casing receiver. The piston has a proximal end and a distal end. The piston casing has an inner surface and an outer surface, wherein the piston casing receives the distal end of the piston thereby forming a resin-holding gap between the distal end of the piston and the inner surface of the piston casing. The piston casing receiver has an inner surface and outer surface, wherein the outer surface of the piston casing and the inner surface of the piston casing receiver define a clearance, wherein the piston casing receiver has a proximal end and a distal end, wherein the distal end has a first opening that is continuous with the clearance, and wherein the piston casing receiver has a continuous side wall that has a second opening therein disposed remote from the distal end of the clearance. The mounting bracket is removably connected to the piston casing receiver for placement on the substrate. The mounting bracket has a bracket plate, a suction device for mounting the bracket plate to the substrate and an aperture in the bracket plate for receiving the piston casing receiver. The pump unit is removably connected to the second opening of the piston casing receiver. The pump unit is for creating a vacuum in the clearance of the piston assembly.

The windshield repair device allows much faster repair of windshield breaks and cracks. The repair device can be used in the three different manners: (1) a pneumatic pressure mode, where gas is used pushed the resin into a crack or break; (2) a hydraulic mode, in which the piston casing is used as an hydraulic to push the fluid resin into the crack or break; and (3) vacuum mode, in which the resin is pulled into an air-evacuated break. Hydraulic action is defined as when the piston is turned clockwise into the piston casing to push the resin out of the resin-holding gap. The repair device can also be used for repairs on vertical glass including storefronts, i.e., the glass on the side of a store or other building pock marks.

Further advantages, features, and objects of the invention will be apparent from the following detailed description of the invention in conjunction with the associated drawings.

DETAILED DESCRIPTION OF THE INVENTION

Figure 1:
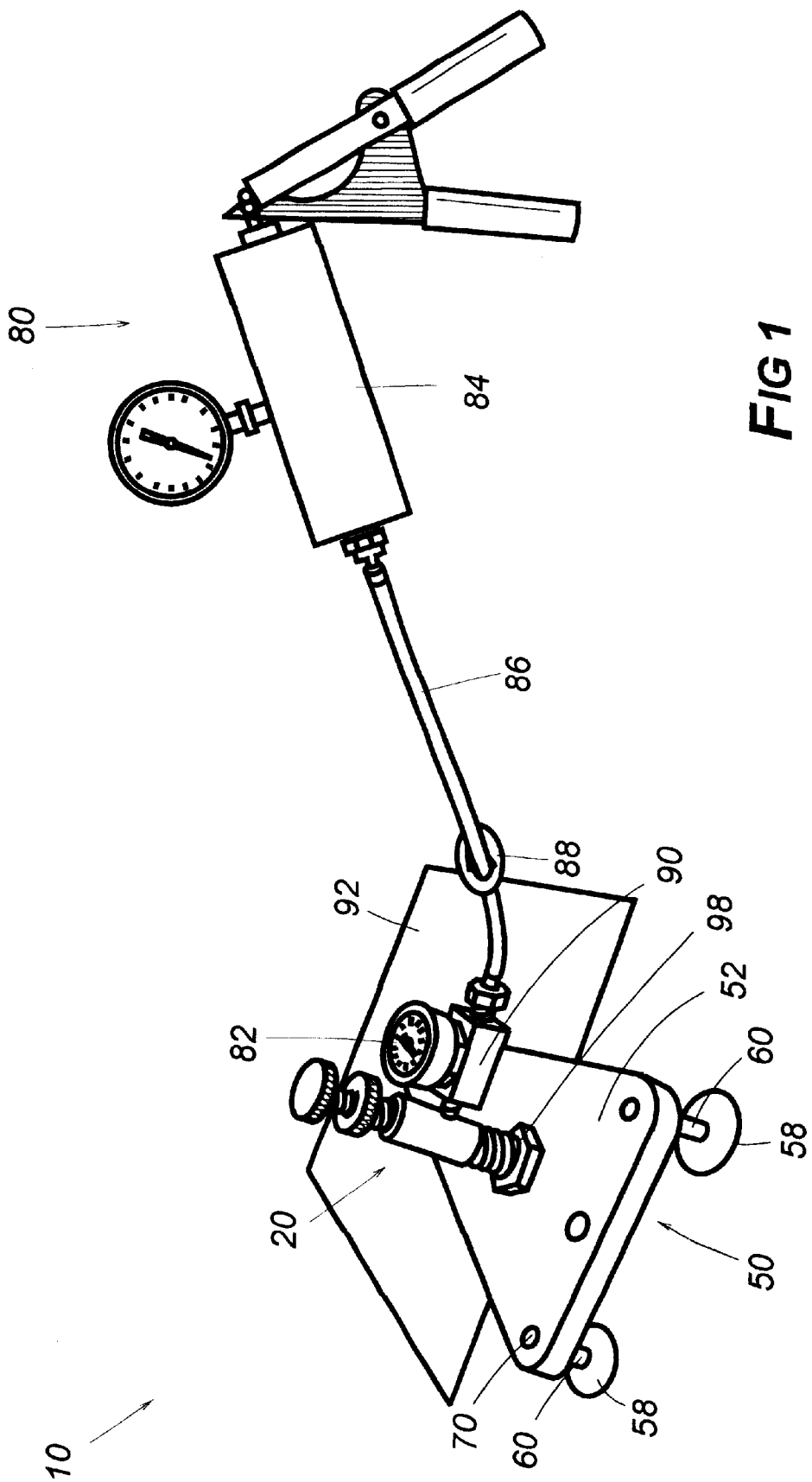
FIG. 1 is a perspective view of a preferred embodiment of the repair device.

Referring to the drawings, the glass repair device is illustrated in FIG. 1 at the reference numeral 10. Preferably, the repair device 10 is made of stainless steel with brass fittings. Alternatively, the repair device 10 can be made of plastic, ceramic, or other materials known to the art with equal efficiency. The repair device 10 has a piston assembly 20, a mounting bracket 50, and a pump unit 80. The resin is placed in the piston assembly 20 and is delivered to the break or crack. The resin is cured to form an invisible repair.

For illustration, the repair device 10 will be described for use in repairing a windshield. It should be understood that the repair device and method are fully applicable for use on breaks and cracks on any substrate such as glass, plastic, or the like. Repairs can be made at any angle, including at a vertical angle. The repair device and method can be also used to repair storefront glass and other vertical glass with equal success.

Figure 2:
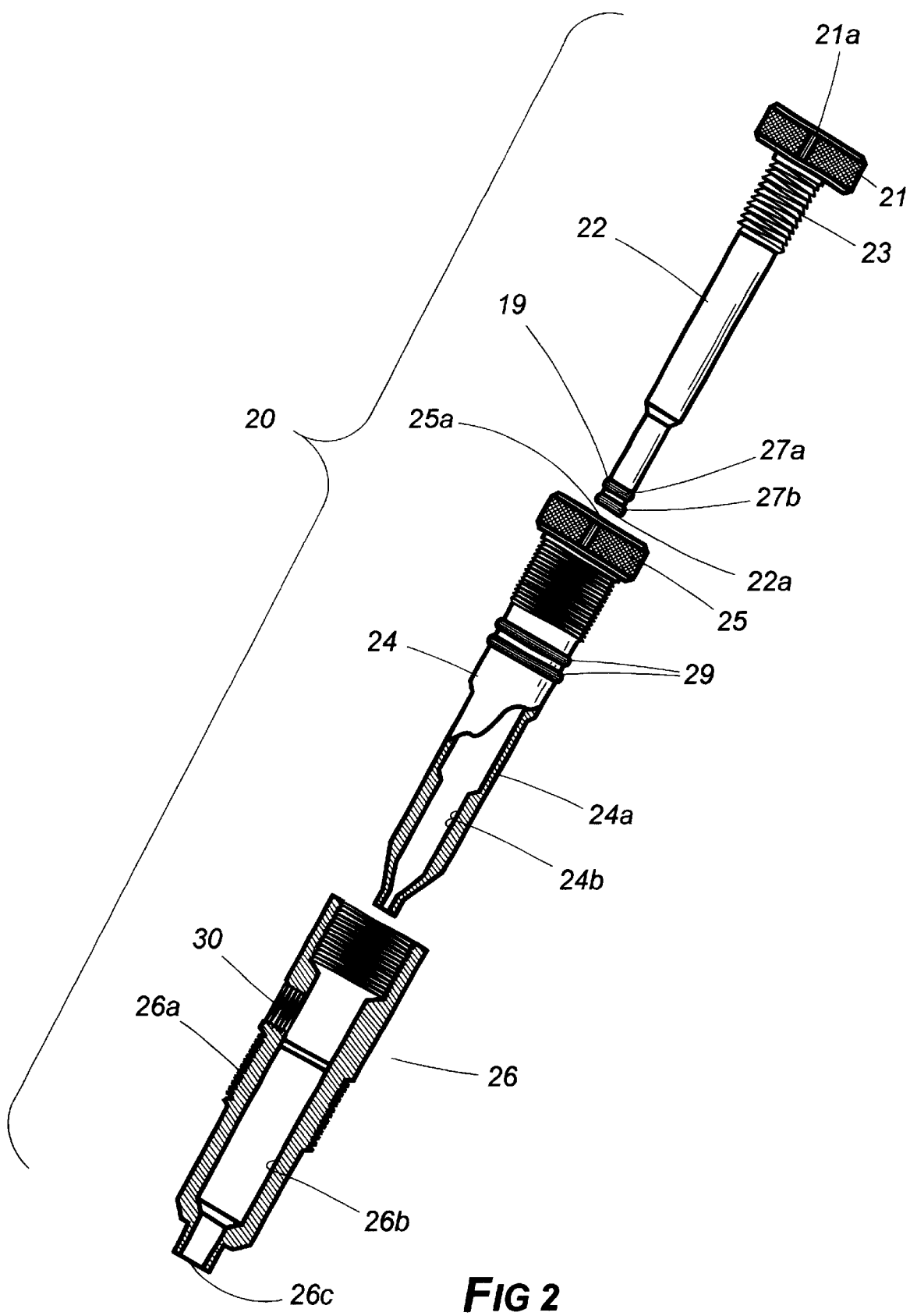
FIG. 2 is an exploded partial cutaway view of a preferred embodiment of the piston assembly of the repair device.

Referring particularly to FIG. 2, the piston assembly 20 has a piston 22, a piston casing 24, and a piston casing receiver 26. An insert 28 (see FIGS. 3A–B) is fitted to the end of the piston casing receiver 26 nearest the repair. The insert 28 rests on the glass. Thus, it is preferably made of a flexible material, such as a rubberized material, that will not scratch the surface of the glass being repaired. A suitable insert 28 is available from Glass Mechanix (Fort Lauderdale, Florida). Insert 28 can be of different sizes to permit repairing differently sized fractures. Alternatively, in place of insert 28, adapters (not shown) of different sizes can be used to accommodate repairing damage of varying sizes.

Referring to FIG. 2, which shows the piston assembly 20 in exploded view, the piston 22 is threadedly attached at 23 to internal threads (not shown) on the piston casing 24. Piston 22 is preferably rotated by grasping knurled grip 21. Piston casing 24 is threadedly attached to the piston casing receiver 26. Piston casing 24 is preferably rotated by grasping knurled grip 25. Both knurled grips 21 and 25 having timing marks 21a and 25a, respectively, thereon to assist in counting the revolutions that the piston 22 and piston casing 24, respectfully, are turned. The timing marks 21a and 25a can be raised markings such that the user of the device 10 does not have to view the timing marks 21a and 25a, but instead can feel them. The piston casing receiver 26 is preferably threadedly attached at 26a to the mounting bracket 52 as illustrated in FIG. 1. The piston casing receiver 26 includes a bore 30 to which fitting 90, illustrated in FIG. 3A, is attached.

The piston 22 preferably includes two seals 27a and 27b, which are disposed in grooves 19 on the distal end 22a of the piston 22 closest to the repair surface. The grooves 19 are preferably 0.125 inches (internal diameter). The seals 27a and 27b on piston 22 permit the creation of a vacuum seal in the piston assembly 20. The bottom seal 27b is preferably made of VITON-brand rubber (Dupont Dow Elastomers L.L.C., Wilmington, Del.).

Figure 3A:
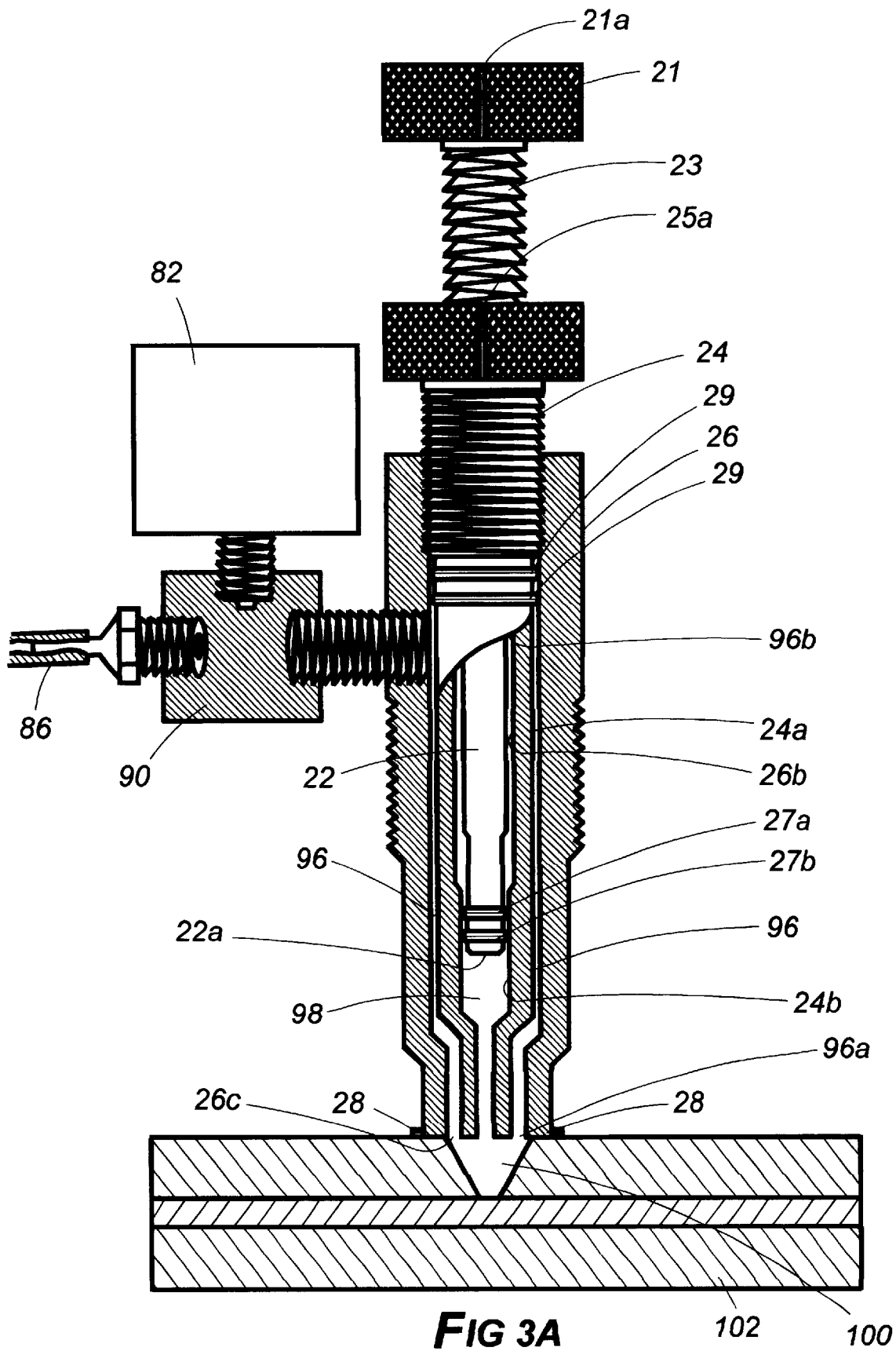
FIG. 3A is a partial cutaway view of the piston assembly, fitting, and vacuum gauge, showing the piston fully retracted within the piston casing, thereby forming a gap that can hold the resin.
Figure 3B:
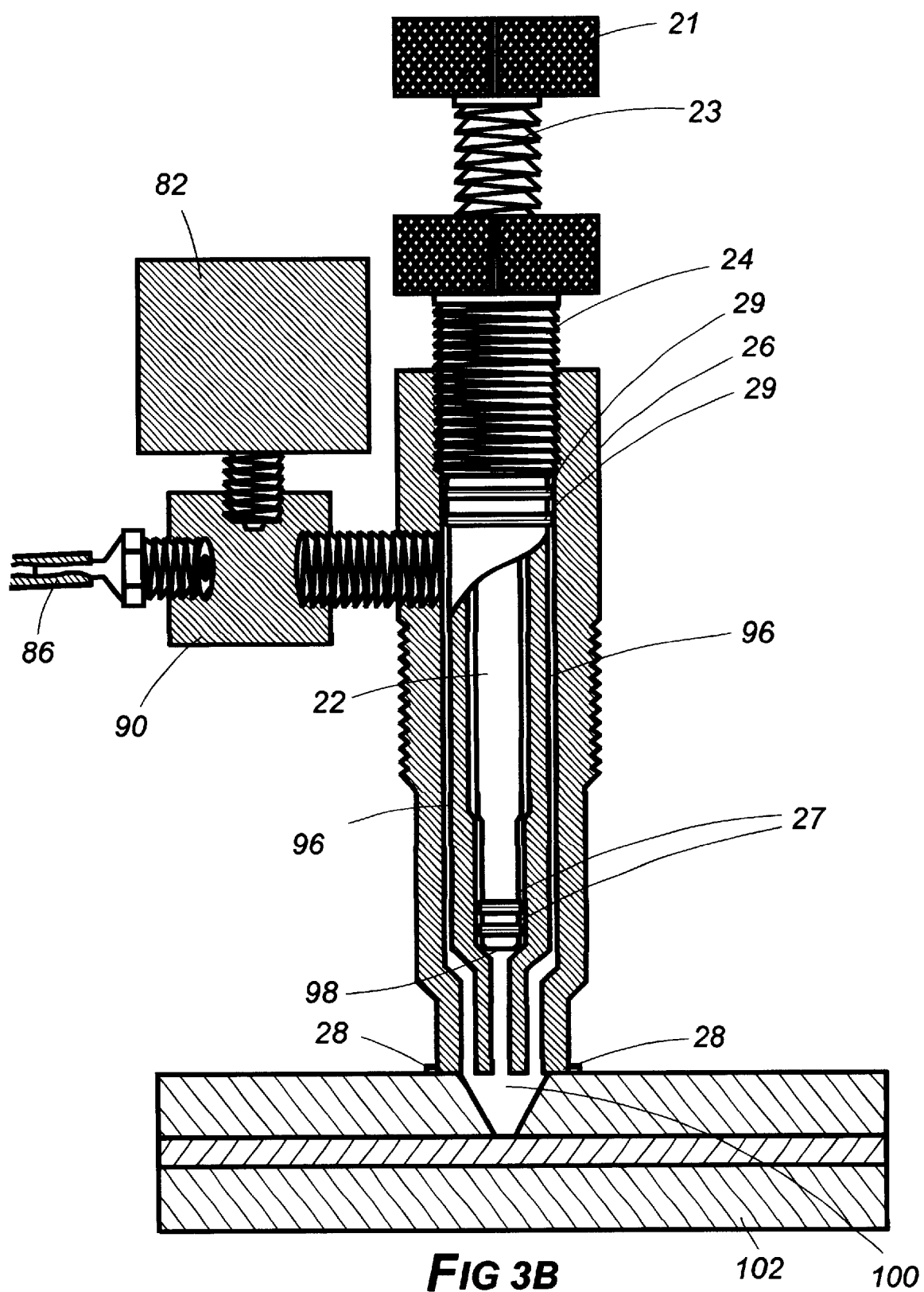
FIG. 3B is a partial cutaway view of the piston assembly, fitting, and vacuum gauge, showing the piston fully extended within the piston casing, wherein the piston assembly has discharged the resin into the break or crack.

As is shown in FIGS. 3A–B, when piston casing 24 is threadedly attached to piston casing receiver 26, a small clearance 96 (preferably of 0.015 inch) exists between the outer surface 24a of piston casing 24 and the inner surface 26b of piston casing receiver 26. The distal end 96a of the clearance 96 is continuous with the opening 26c of piston casing receiver 26 when the piston casing 24 is fully retracted within piston casing receiver 26. The proximal end 96b of the clearance 96 is sealed by seals 29 of piston casing 24. The fitting 90 is located between opening 26c and proximal end 96b and opens to clearance 96. Thus, when the insert 28 is biased against the windshield, a vacuum can be generated by pump unit 80, as illustrated in FIG. 1. The vacuum will remove the air from the break 100 in the glass 102 beneath the insert 28. Alternatively, in crack repair, this configuration forces air from the pump 84 to the resin, thereby forcing the resin into the crack with pneumatic pressure. Thus, pneumatic pressure to resin application is another way this machine can work. The preferred method is by hydraulic pressure.

The piston casing 24 preferably has two seals 29 disposed near the proximal end of the piston casing 24 in grooves 23, which are preferably 0.510 inch±0.0005 inches (outside diameter). The seals 29 are made of rubber, or other material, to ensure an airtight seal. Referring to FIGS. 3A–B, the placement of the seals 29 above the vacuum line 86 and fitting 90 permits the formation of a vacuum, thereby permitting the vacuum pump 84 to draw air out of the break during break repair. The placement of the seals 29 above the vacuum line 86 also permits air to be delivered from the pump 84 through the piston assembly 20 to force air against resin placed on a windshield crack, pushing the resin into the crack. Again, pneumatic pressure is one option and hydraulic pressure is another preferred option. Repair methods are detailed below.

Referring to FIG. 3A, when piston 22 is threadedly attached to piston casing 24, a resin-holding gap 98 exists between the distal end 22a of of piston 22 and the the inner surface 24b of piston casing 24. To load the resin into the gap 98, piston 22 is threadedly attached to piston casing 24. Both are placed into a container holding resin. To draw the resin into the gap 98, the knurled grip 21 of the piston 22 is then rotated counterclockwise while the knurled grip 25 of piston casing 24 is held in place. After the resin is loaded into the gap 98, piston 22 and piston casing 24 are threadedly attached to piston casing receiver 26. Alternatively, a needle and syringe (not shown) are used to load the resin-holding gap 98 through the hole in the end of piston casing 24. For this, the piston 22 is turned fully counterclockwise.

To inject the resin from the gap 98 into the break or crack, the knurled grip 21 of piston 22 is turned clockwise, thereby retracting the piston 22 within the piston casing 24. The retracting action reduces the size of the gap 98, as is shown in FIG. 3B, thereby moving the resin from the gap 98 into the break or crack by hydraulic action.

Figure 4A:
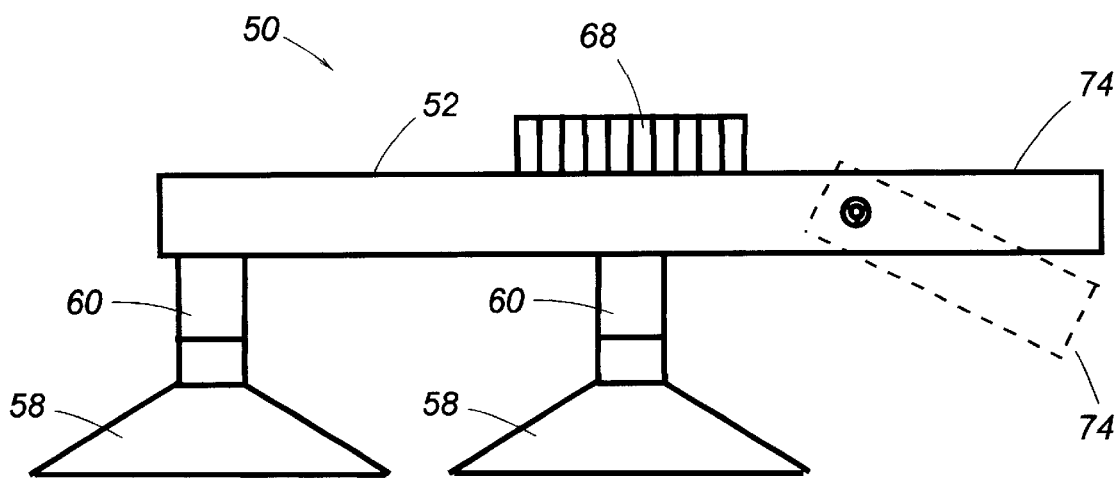
FIG. 4A is a side view of the mounting bracket.
Figure 4B:
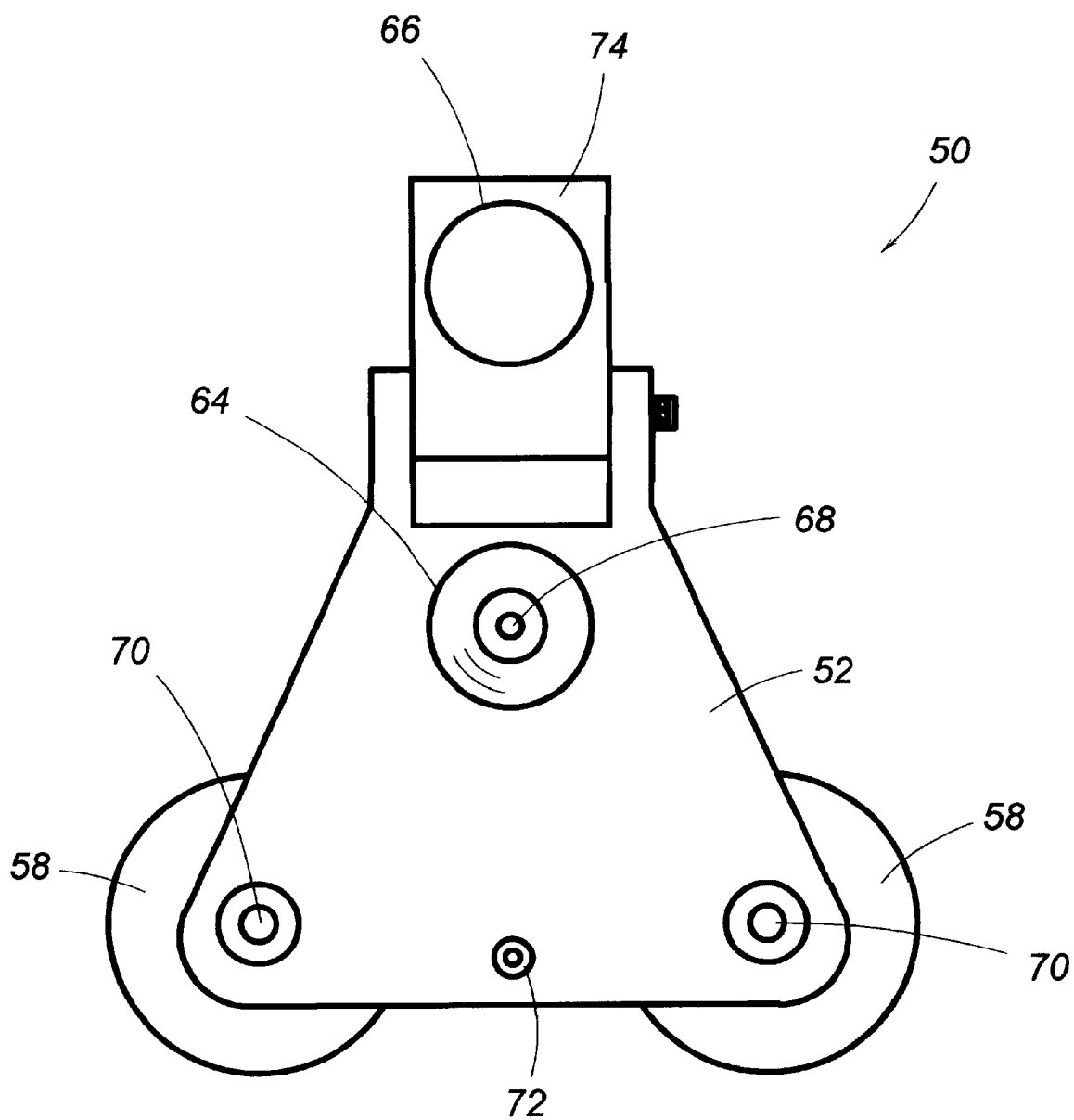
FIG. 4B is a top view of the mounting bracket.
Figure 4C:
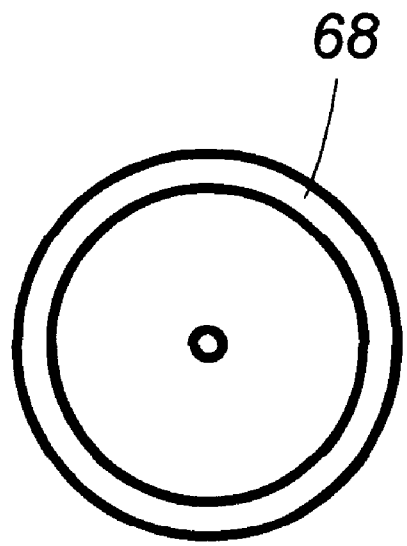
FIG. 4C is a top view of the plug of the mounting bracket.
Figure 4D:
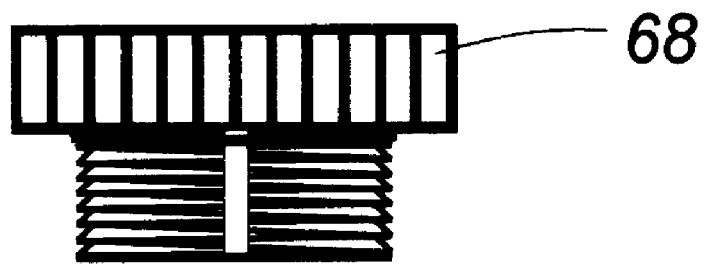
FIG. 4D is a side view of the plug of mounting bracket.

An exemplary mounting bracket 50, shown in FIGS. 1 and 4A–B, includes a bracket plate 52, one or more (preferably three) suction cups 58, and a corresponding number of spacers 60, which permit leveling the mounting bracket 50. The spacers 60 are disposed between the head of a screw 70 and the suction cup 58. A leveling device 72 is also included in the bracket plate 52 between the suction cups 58. The suction cups 58 are preferably made of a material that is flexible enough to permit the attachment of suction cups 58 to a curved windshield. Flexibility in the suction cup 58 also allows the repair device 10 to be guided along a layer of lubricant on the windshield during crack repair. After a break is repaired, the suction cup 58 is released. In contrast, in conventional repair devices, when reloading the resin, this requires movement of the conventional repair device, which flexes the windshield. Flexing the glass is undesirable because it allows air to reenter the crack. The suction cups 58 are mounted on the underside of the mounting bracket such that it can removably attach the bracket plate 52 to the windshield.

Referring in particular to FIG. 4B, the bracket plate 52 has a first aperture 64 through which the piston casing receiver 26 is received. The aperture 64 is sized such that the piston casing receiver 26 can fit through it and be attached thereto. The piston casing receiver 26 threadedly attaches to the bracket plate 52. Referring to FIG. 1, a nut 98, preferably made of brass, is used to restrain movement of the piston casing receiver 26 when the piston casing 24 and piston 22 are rotated. The bracket plate 52 can either be planar and solitary, as in the bracket plate 52 of FIG. 1, or it can have two pieces (52 and pivotal extension 74) that are hingedly attached, as is shown in FIGS. 4A–B. As FIG. 4A shows in hatched lines, pivotal extension 74 can be moved toward the windshield. For this version, the bracket plate 52 includes a first aperture 64 and a second aperture 66. This version of the bracket plate 52 permits access to breaks and cracks near windshield molding on sharply curved glass. The extension also is useful for getting a perpendicular seal on any sharply curved surface. The alternative embodiment of the bracket plate 52 also allows the plate 52 to follow a curve and to provide more stabilization.

When the two-piece bracket plate 52 is used, a plug 68 (shown in FIGS. 4A–D) is provided to fit into the unused aperture. Preferably, the plug 68 is made of brass or similar material. Also preferred is a plug 68 with a ¼" 20 threaded aperture in its center. The center aperture is for threadedly attaching suction cup 58.

Preferably, the bottom of the bracket plate 52 is white or other light color. This permits better viewing of the break to ensure that all air is removed from the break while using a mirror on the inside of the glass to monitor the progress of the repair.

As is shown in FIG. 1, the pump unit 80 includes a vacuum gauge 82, a vacuum pump 84, a vacuum line 86, a lock 88, and a fitting 90. The vacuum pump 84 is connected to a vacuum pressure gauge 82, which reads either the pressure of the vacuum or the pressure of air being applied, by vacuum line 86 at the fitting 90. For locking the vacuum or pressure, a lock 88 is mounted on the vacuum line 86 (preferably a quarter-inch nylon vacuum line). A suitable pump 84 is a 50-cc syringe, but could be replaced with a number of other vacuum pumps, such as a hand-held vacuum pump, or even a power vacuum line, all with equal success. One pull on a 50-cc syringe creates the needed vacuum to max out the vacuum gauge. The 50-cc syringe can be used if electing to use quick pulls to accelerate the vacuum and to release the vacuum. The vacuum pump 84 is preferably manual and provides a pure vacuum.

The vacuum gauge 82 is threadedly attached to the piston casing receiver 26 at fitting 90. The vacuum gauge 82 provides the advantage of being able to apply the least amount of pressure onto the surface of the windshield. In particular, this feature is important in repairing bulls-eye breaks, which are circular breaks moving out away from the impact point at a 45-degree angle, giving a characteristic circular dark spot. If a repair device 10 is screwed down too tightly against the windshield break, it would compress the glass in on itself. This compression would tightly compress the broken area in the glass, making air evacuation and resin application far more time consuming, if possible. The repair device 10 avoids compressing the glass by permitting backing off the piston casing receiver 26 until the vacuum is lost. The piston casing receiver 26 is then turned about one-quarter turn more to allow a seal on the windshield that is the minimal seal needed to repair the glass.

The general repair method for repairing breaks is as follows. The pump unit 80 creates a vacuum, pulling air from the break, through clearance 96, and to pump 84, where the air is evacuated, thereby removing most (if not all) of the air from the break. A vacuum is thus created in the break. The resin then is applied to the air-evacuated break via the piston assembly 20. Specifically, with the resin in the resin-holding gap 98, piston 22 is turned to lower piston 22 and force the resin from the resin-holding gap 98 to the break, as is shown in FIG. 3B. The resin is both (1) pulled into the break by the vacuum in the air-evacuated break and (2) pushed into the break by the hydraulic action of the piston assembly 20. If more resin needs to be added to complete the repair, piston 22 and piston casing 24 are removed from piston casing receiver 26. The rest of the repair device 10 including the piston casing receiver 26 remains over the break. The initially applied resin, which covers the break, prevents air from reentering the break when the piston casing 24 and piston 22 are removed.

For repairing cracks, the following method is generally used. The resin is placed over the crack, and the pump 44 is used to push gas toward the resin, thereby forcing the resin into the crack. In addition, the hydraulic pressure of the piston assembly 20 pushes the resin into the crack. Again, more resin can be added to the piston assembly 20 as is described above. The minimal downward pressure on the glass is used, thereby preventing the glass from flexing during the repair process. Also, crackerjacks (known in the art) can be used on the inner surface of the windshield to force the crack open, thereby allowing easier resin application to the crack.

For applying the resin, the repair device 10 can be operated in (1) a pneumatic pressure mode, where gas is used pushed the resin into a crack or break; (2) a hydraulic mode, in which the piston casing 24 is used as an hydraulic to push the fluid resin into the crack or break; and (3) vacuum mode, in which the resin is pulled into an air-evacuated break. Hydraulic action is defined as when the piston 22 is turned clockwise into the piston casing 24 to push the resin out of the resin-holding gap 98. It should be noted that even though there is an aperture in the end of piston casing 24, which is full of the resin, it acts as a solid piston.

Details of preferred methods of operating the repair device 10 are provided below. Preferably, resins that are useful with the repair device 10 are those that cure with ultraviolet (UV) light. As is shown in FIG. 1, for resins requiring UV light to cure, an optional sun shield 92 prevents the resin from prematurely curing. An optional UV light 94 (not shown) for curing the resin is optionally provided.

For dislodging air from complex breaks, such as a badly damaged bulls-eye break, a vibrator with a rubber contact point is used. Specifically, a medium power, two-speed back vibrator is attached to an inverted suction cup, which is affixed with an adhesive (preferably with SUPER GLUE-brand (Al-Nazeer Nippon Chemicals, New York, N.Y.) to the contact point for vibration. The cup dampens the shock being delivered to the windshield. The vibration can be directly placed opposite to the repair area. The vibration is briefly applied to the damaged glass area to allow the trapped air in difficult breaks to loosed up and be drawn out of the break on the vacuum cycles.

A first preferred method of using the repair device 10 is for repairing breaks. A vacuum is pulled. The repair device 10, with the piston 22 and piston casing 24 removed, is centered over the break by placing the piston casing receiver 26 over the break. A user can look through the piston casing receiver 26 to locate the impact point. Once the impact point is located, the repair device is attached to the windshield by pressing on the repair device such that suction cups 58 engage. The resin-holding gap 98 of the piston assembly 20 is loaded with the resin. This can be accomplished by simply lowering the piston 22 and piston casing 24 into a container holding the resin. The piston 22 is turned counterclockwise within the piston casing 24 to draw up the resin into the gap 98. Then piston 22 is rotated clockwise to drive any air out of piston casing 24. The loaded piston 22 and piston casing 24 are then threadedly attached to piston casing receiver 26.

A vacuum is drawn with vacuum pump 84. While the vacuum is applied, and the piston casing 24 is turned clockwise approximately two complete turns, and then piston 22 is turned two turns clockwise, applying the resin. Then, piston casing 24 is turned clockwise to cause hydraulic pressure to more resin from the gap 98 to the break. The vacuum is then cycled by performing the following steps:

1. First, a vacuum of 30 inches of mercury is applied to damaged area for at least two minutes. During this vacuum cycle the vibration device can be used if desired.
2. The piston casing 24 is turned clockwise two turns per timing mark 25a on the knurled grip 25. This couples the piston casing 24 to the rubber insert 28.
3. The knurled grip 21 of piston 22 is turned one and one half to two turns clockwise to apply the resin.
4. Once the resin has been applied to the surface of the windshield in step 3, piston casing 24 is turned clockwise approximately two more turns. This supplies direct hydraulic pressure to the break. Direct pressure is applied for two minutes.
5. Piston casing 24 is backed off with counterclockwise motion until the vacuum on the gauge 82 is lost, and then the timing mark 25a is realigned by turning the piston casing 24 clockwise until the timing marks 21a and 25a line up.
6. Then vacuum pump 84 is connected to the vacuum line 86 and given 20 pulls.
7. Vacuum pump 84 is now attached to the vacuum line 86 and 30 inches of mercury in a vacuum is applied for two minutes.
8. Piston casing 24 is then turned down clockwise for two full turns on the timing mark 25a, thereby causing direct hydraulic pressure. Pressure is held for two more minutes.
9. The repair device is released, and the surface of the glass is wiped off, and one drop of pit filler is applied to the pit and covered with a nylon square and cured.

Both the drawing of the vacuum and the hydraulic action of the piston assembly 20 accelerates the resin application. Any grade of resin viscosity can be used without the resin dripping out of the injector. The injector can be placed at any angle to accomplish this result. Even vertical glass or the underside of horizontal glass can be repaired using the repair device 10. This is accomplished by coupling the piston casing 24 with the insert 28 before the resin is applied. Then direct hydraulic pressure can be applied. Other systems use a gravity feed of the resin on a 90-degree angle elbow and use pneumatic pressure to move resin into break. Conventional systems use elbows or angled fixtures to gravity feed then use pneumatic pressure. Hydraulic units cannot first evacuate air before resin is applied. Some other conventional systems use displacement theory which can press air into polyvinyl butyral (PVB) material. Some conventional systems can repair vertical glass, however, they rely on pneumatic pressure.

A second preferred method of using the repair device 10 is for doing a simple "angle wing break," which is a small impact point with one small crack on each side about one quarter inch each, the following procedure is preferred. This method is used on angle wing breaks where quick vacuum cycles are desired and use of a very thin resin such as that used to repair star breaks.

First, the impact point is drilled with a carbide drill at angles toward the crack on each side of the impact point. Then a hair dryer or a "dry star" machine can be used to assure that all moisture is gone. Then a small needle is placed into the aperture and struck lightly with a tappet to produce a small bulls-eye to open up the crack just a little. Then the piston casing receiver 26 is screwed into the bracket plate 32 with the piston casing 24 and piston 22 removed. The impact point of the damaged area is then located by looking directly down the piston casing receiver 26, and suction cups 58 on the bracket plate 52 are stuck onto the windshield so impact point is directly in view looking down the piston casing 26.

A four-inch eyedropper (or similar repair device) with a few drops of the resin is placed into the insert 28 at bottom of piston casing receiver 26 to load insert 28 with the resin.

With piston 22 screwed into piston casing 24, the piston casing 24, which contains the resin, is placed into the piston casing receiver 26 until the seal 29 is contacted, then the piston casing 24 is turned clockwise once to ensure a good seal.

Using a hand vacuum pump 84, suction is pulled and released ten times. This causes suction right over the windshield break. For this type of repair, the vacuum essentially pulls air out of the break through the resin.

After the suction cycles, the vacuum pump 84 is released from the vacuum line 86, and hand vacuum pump 84 handle is pulled all the way back, and vacuum line 86 is reattached, and pneumatic pressure is pushed until gauge 82 shows twenty pounds pressure, then lock 88 is engaged. Pressure is held for about five minutes, then released. Alternatively, a vacuum can be applied for approximately two minutes and the piston casing 24 can be turned two complete clockwise revolutions. The knurled grip 21 of piston 22 can be turned two turns to fill the insert 28 with the resin. Then, with the knurled grip 25 of piston casing 24 is turned clockwise to force the resin into the break. Direct hydraulic pressure is applied for approximately one minute.

The repair device 10 is then removed using a metal scribe to break suction cups 58 from the windshield. The process also contemplates curing the resin under pressure for approximately two minutes prior to removal. This will harden the resin in small cracks and prevent resin receding from the tips of the cracks.

One drop of pit filler is placed over the impact point, using a tooth pick or a metal scribe to assure air is out of pit area, and a strip of material (preferably MYLAR-brand material) is placed to seal the break, and repair is cured with ultra-violet light for a few minutes.

The strip is then removed, and hardened pit filler is scraped perpendicular to the windshield until the resin over pit area is scraped until flush with the windshield. A polish is placed over impact area and polished until pit area is shiny.

A third preferred method of using the repair device 10 is for repairing bulls-eyes and combination breaks either on a vertical plane or on a regular angled windshield. Piston casing receiver 26 is aligned with impact point and bracket plate 52 is attached with the suction cups 58. The impact area is drilled with drill (preferably a ball burr carbide dentist tool) as deemed necessary.

An appropriate grade resin is chosen and drawn into a syringe with needle. The resin is injected into the small opening of the piston casing 24, with piston 22 in the retracted position, with just a few threads holding it into the piston casing 24. After injecting the resin, the knurled grip 21 of the piston 22 is turned clockwise until all air has been driven out of piston casing 24. Then the knurled grip 21 of the piston 22 is backed one-half turn to hold the resin in place. This action causes a slight vacuum to hold the resin in piston casing 24 in place during the machine's vacuum cycle, when air is drawn out of the damaged windshield, so as not to draw out the resin from piston casing 24, until it is desired to be released. A vibrator as described above can be used. The vibrator is used while the break is exposed to a vacuum of 30 inches of mercury after heating the break from the opposite side of the windshield for about four seconds. Vibration can allow any trapped air in the breaks to work free. This vibratory function is only used when encountering a severely damaged bulls-eye, to help dislodge trapped air. Most applications do not require the use of the vibrator. A vibrator can be used prior to resin application during the direct pressure and once again during the vacuum cycle.

The piston casing 24, with the piston 22, is then fitted into the piston casing receiver 26, and turned clockwise until seal 29 is contacted, and turned clockwise another two turns. This seals the piston assembly 20.

A pistol-grip type suction pump 84 is used to attach to a fitting on the vacuum line 86. On the reverse side of the windshield, the bulls-eye area is heated with a spot heater, lighter, or match for a few seconds, and a vacuum of 30 inches of mercury is applied, and the lock 88 of vacuum line 86 is engaged. The vacuum is maintained for two minutes before screwing down the piston casing 24 two turns clockwise, coupling up with the insert 28, then releasing the resin via the piston 22, turning piston casing 24 to the end of travel clockwise, and holding the resin under hydraulic pressure for 2.5 minutes. Optional heating of the bulls-eye thins out air in bulls-eye to enhance air evacuation from bulls-eye.

After three minutes of vacuum, the pump 84 is reattached to vacuum line 86, and lock 88 is released. Pump 84 is given one more pump to assure 30 inches of vacuum is maintained. After the piston casing 24 couples with the insert 28, 30 inches of vacuum pressure is locked in using the lock 88.

The piston casing 24 is now turned down clockwise one and three quarters to two turns, and piston 22 is turned clockwise until insert 28 is full of the resin. Then, piston casing 24 is turned to the end of travel. The operator should notice rapid filling of the bulls-eye cavity now. After direct hydraulic pressure has been applied for two minutes, piston 24 is backed off counterclockwise until the vacuum on gauge 82 is lost. The syringe 84 is then attached to vacuum line 86 and twenty pulls draws vacuum over the applied resin. This aids in floating any trapped air from break. Then piston casing 24 is turned clockwise until direct hydraulic pressure is applied.

Then the piston casing 24 is backed off four turns via timing mark 25a on the piston casing 24. This again exposes the resin over the break to 30 inches of vacuum. Allow exposure of two minutes, and then simply turn piston casing 24 back down clockwise to end of travel. If additional trapped air is detected, the knob of the piston 22 can be backed off a couple of turns, and turned back down two turns. This works well on vertical windshield applications. Note, this procedure is used on vertical repairs. This causes a "wave" action to help dislodge trapped air and to force the resin into all voids of the bulls-eye. Hydraulic pressure is applied for another couple of minutes, until area of bulls-eye appears clear.

The machine is removed, and the pit area is capped off with pit filler, using a toothpick or a metal scribe to assure no air is in pit area, then cover with a strip (preferably a MYLAR-brand strip), and cure repair with UV light for at least three minutes.

A fourth preferred method of using the repair device is for crack repair. A layer of petroleum jelly is coated along the length of the crack and the piston casing receiver 26 is placed directly over the crack on one end. This is done by looking down the piston casing receiver 26. The resin is loaded as above, and the piston 22 and the piston casing 24 are inserted into the piston casing receiver 26 and screwed down to the end of travel (about four turns). Then direct piston pressure is accomplished by turning the knurled grip 21 of the piston 22 until resin starts to slightly ooze from the insert 28. When the crack starts filling, the repair device 10 is slowly slid along the crack to fill the crack. Then the crack is topped off with a pit filler resin, and MYLAR-brand strips are applied until the crack is cured with UV light. The piston casing 24 will hold approximately enough resin to repair a six to eight inch crack. If more resin is needed, the piston 22 and the piston casing 24 are removed and refilled, and reloaded into the piston casing receiver 26. Then knurled grip 21 on the piston 22 is turned clockwise again after placing the insert 28 over the crack, and continued until the crack is filled. Pneumatic pressure can be applied to push the resin into the crack.

Optionally, to relieve pressure on a crack, a small aperture can be drilled in front of the crack to the plastic inner layer.

Then, the crack is run into the drill hole using a scribe. Drilling is done by using carbide ball burrs or drill bits (carbide) or thumb pressure applied on an inner windshield adjacent to damaged area.

For this preferred method, and only on star breaks and bulls-eyes, it is absolutely imperative that the vacuum on gauge 82 is always maxed out on 30 inches while turning the piston casing 24 to end of travel, this assures no air re-enters the bulls-eye or star break.

For vertical glass repair, the method works the same except that the above steps starting with the piston casing 24 being backed off four turns through to the step where hydraulic pressure is applied for another couple of minutes, are omitted. This is because the resin would drain out of the insert 28. Only hydraulic pressure is used on vertical repairs. It is applied after the vacuum is applied. Partial curing under pressure is desirable for this method.

A fifth preferred method of using the repair device 10 is for repairing cracks in windshields. For this, a layer of petroleum jelly is coated along the length of crack to permit floating of the suction cup 58 over the windshield. The suction cup 58 is attached to the windshield with the piston casing receiver 26 placed directly over the crack. This is done by looking right down the piston casing receiver 26. The resin is loaded as above, and the piston 22 and the piston casing 24 are fit into the piston casing receiver 26 and screwed down to the end of travel, about four turns. Then direct piston pressure is accomplished by turning the piston 22 until resin starts to slightly expand the insert 28. Additionally, pneumatic pressure can be directed over the resin to force the resin into the crack after the crack widens. When the crack starts filling, the repair device 10 is slowly slid along the crack as the crack fills, then the crack is capped off with a pit filler resin, and MYLAR-brand strips are applied until the crack is cured with UV light. The piston casing 24 will hold approximately enough resin to repair a six to eight inch crack. If more resin is needed, the piston 22 and piston casing 24 are slid just slightly off the crack, and the piston 22 and the piston casing 24 is removed and refilled, and reloaded into the piston casing receiver 26, and knurled grip 21 on piston 22 is turned clockwise again after placing the insert 28 over the crack, and continued until the crack is filled. The fluid over the break will keep the air from re-entering the crack. This is true even when the piston casing 24 and piston 22 are removed to refill them with more resin.

A sixth preferred method of operating the repair device 10 for repairing long cracks is to initially start using the piston 22 to drive the resin into the tightest end of the crack to get the crack filling started. After the crack gets wider where the resin will flow without as much pressure, then the resin left in the piston casing receiver 26 is pressed out. Then the piston casing 24 is removed, extra resin is added, and the piston casing 24 is set back into the piston casing receiver 26 to seal the pneumatic pressure, then the pneumatic pressure over the resin forces resin into crack.

Further still, the resin can be placed at the bottom of piston casing receiver 26 using two drops of the resin per inch, and then using the piston 22 and the piston casing 24, which contains the resin, to be turned clockwise forcing the resin into the break using hydraulic pressure and no pneumatic pressure.

A seventh preferred method of operating the repair device 10 is for a very long crack, an alternate method of operation of this machine is performed. With the piston casing 24 and piston 22 removed, the proper amount of the resin of one drop per inch of crack length plus two is dripped directly down the receiver-casing receiver 26. The piston 22 and piston casing 24 is screwed into the piston casing receiver 26 until the seals 29 of the piston casing 24 engage plus one turn. The hand pump 44 attached to the vacuum line 46 is used to direct pneumatic pressure over the resin to drive the resin into the crack, using around twenty pounds of pneumatic pressure, which registers on the vacuum gauge 42. Thus, a very long crack can be filled without removing the piston casing receiver 26. Slight pressure with piston casing receiver 26 is kept on the windshield without letting the windshield flex. Preventing the flexing of the windshield is a major advantage over conventional repair devices. Crack expanders hold the crack open until the filled crack is cured.

An eighth preferred method of operating the repair device 10 is on a single layer sheet glass. On store front pock marks, a piece of glass is punched out of glass, thus creating a pock. Impact generally caused by a BB gun or pellet gun. The small end of hole the in the glass is usually on the street side. The large end of the hole in the glass is sealed off using MYLAR-brand material that is large enough to cover the large hole. A flat plexiglass plate is pressed up against this using a crack jack to hold it in place.

On the exterior of the glass, the repair device 10 is placed over the impact point. A thick resin designed for large, open damage areas is loaded in piston casing 24. All air from the break is evacuated using the pump 84. Then the resin is pressed into the void, and curing is done under pressure with exposure to natural sunlight or a UV lamp. An extended curing time is needed to cure larger amounts of the resin. Then resurfacing is done as usual.

This repair device 10 will operate on any angled windshield, vertical windshields, or any glass at any angle without any configuring changes. The repair device 10 can even be used upside down for interior crack repair, for example. Also this repair device 10 will hold the thinnest resin without any loss of the resin. Thinner resins are easier to apply than viscous resins. After the break is filled, the mounting bracket 30 is removed, the damaged area is filled, a strip (preferably a MYLAR-brand strip) is placed on the windshield, and UV light is applied to start curing the resin. After use, the unit is washed with a solvent such as denatured alcohol. Denatured alcohol is preferred as it does not break down insert 28 fitting or damage seals 27a, 27b, and 29.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

First, any type of pump can be used with the repair device 10. While a manual suction pump 84 is preferred because it has the advantage of no requirement for power attachments, a power vacuum pump will also work. As noted above, a syringe can also be used as the pump 84.

Second, the invention is not limited to repair device for the repair of only windshields or glass. The repair device 10 can be used to repair any substrate that typically is repaired with a resin or other liquid.

Third, the heating step in some of the preferred methods is optional. The advantage of heating includes that it thins air in a break or crack, thereby permitting faster removal of air. However, this step is not required or always desired.

Fourth, the parts that are described in the preferred embodiment as being threadedly attached could be attached by any other method. Alternatively, these pieces could be integral.

The invention is not intended to be limited to the preferred embodiments described above, but rather is intended to be limited only by the claims set out below. Thus, the invention encompasses all alternate embodiments that fall literally or equivalently within the scope of these claims. It is understood that in the claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. A repair device for breaks and cracks in a glass or plastic substrate comprising:
   a a piston assembly comprising in turn
      i a piston having
         a proximal end and a distal end; and
         a seal at the distal end of the piston; and
         rotation grips;
      ii a piston casing having
         an inner surface and an outer surface wherein the piston casing threadably receives the piston, thereby forming a resin-holding gap between the distal end of the piston and the inner surface of the piston casing, the gap sealed by the piston seal; and
         a seal; and
      iii a piston casing receiver having
         an inner surface and outer surface wherein the piston casing receiver threadably receives the piston casing and the outer surface of the piston casing and the inner surface of the piston casing receiver define a clearance having a proximal end and distal end, the proximal end sealed by the piston casing seal;
         a proximal end and distal end having a first opening that is continuous with the clearance;
         an insert connected to the piston casing receiver at the first opening;
         a continuous side wall that has a second opening therein disposed remote from the distal end of the clearance; and
         rotation grips; the repair device further comprising
   b a mounting bracket removably connected to the piston casing receiver for placement on the substrate and comprising in turn
      i a bracket plate having a threaded aperture for receiving the piston casing receiver;
      ii a suction device for mounting the bracket plate to the substrate;
      iii leveling means; and the repair device further comprising
   c a pump unit removably connected to the second opening of the piston casing receiver for creating a vacuum or pressure in the clearance of the piston assembly, comprising in turn
      i a vacuum pump for creating a vacuum in the clearance of the piston assembly for removing gas and liquid from the break;
      ii a fitting for connecting the vacuum unit to the piston casing receiver at the second opening; and
      iii a vacuum gauge.

2. The repair device of claim 1 wherein the pump unit further comprises a positive pressure pneumatic system for creating pressure in the clearance of the piston assembly for forcing a gas into the crack.

3. The repair device according to claim 1 wherein the rotation grips further comprise timing marks.

4. The repair device according to claim 3 wherein the timing marks comprised by the rotation grips further comprise raised markings.

* * * * *